No. 682,850. Patented Sept. 17, 1901.
H. JENKINS.
HORSESHOE.
(Application filed Feb. 19, 1901.)
(No Model.)
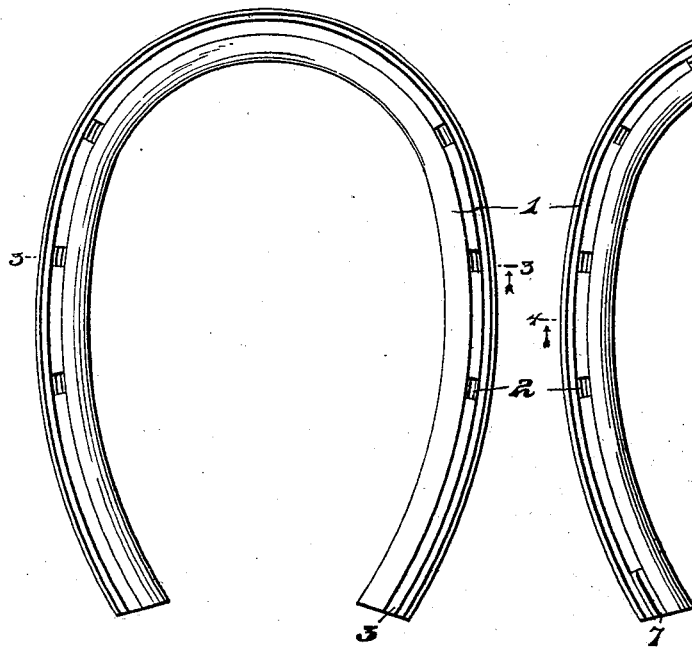
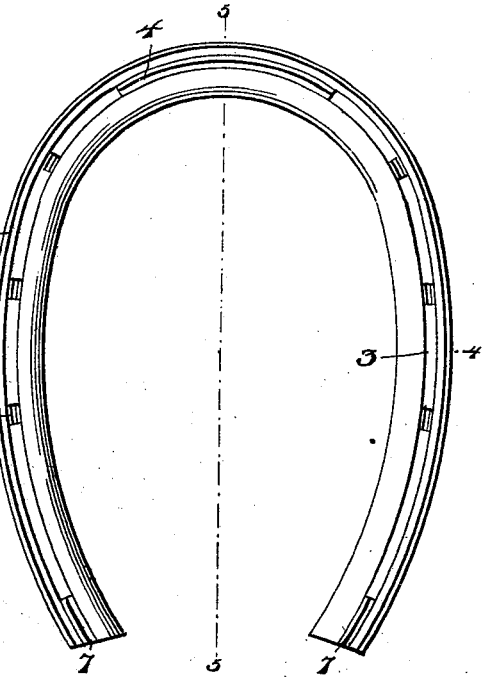
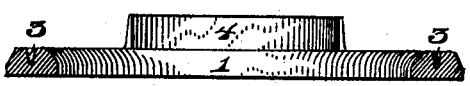
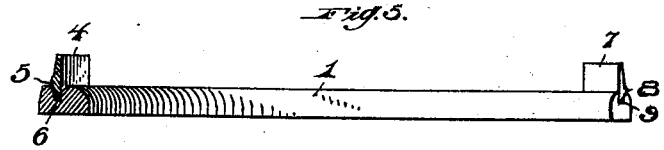
Witnesses:
J. P. Hefleman
C. E. Potter
Inventor
Henry Jenkins
By
H. C. Everette
Attys

UNITED STATES PATENT OFFICE.

HENRY JENKINS, OF McKEES ROCKS, PENNSYLVANIA.

HORSESHOE.

SPECIFICATION forming part of Letters Patent No. 682,850, dated September 17, 1901.

Application filed February 19, 1901. Serial No. 47,955. (No model.)

*To all whom it may concern:*

Be it known that I, HENRY JENKINS, a citizen of the United States of America, residing at McKees Rocks, in the county of Allegheny and State of Pennsylvania, have invented certain new and useful Improvements in the Manufacture of Horseshoes, of which the following is a specification, reference being had therein to the accompanying drawings.

This invention relates to certain new and useful improvements in horseshoes, and has for its object the provision of novel means whereby a hard-steel calk or toe-piece may be easily applied to a horseshoe of any form, shape, or description.

The invention further aims to provide novel means whereby the calks and toe-pieces may be easily attached to a horseshoe and readily removed therefrom when desired.

The present invention further aims to construct a horseshoe that will be extremely simple, strong, durable, and comparatively inexpensive to manufacture.

With the above and other objects in view the invention consists in the novel combination and arrangement of parts to be hereinafter more fully described, and specifically pointed out in the claim.

In describing the invention in detail reference is had to the accompanying drawings, forming a part of this specification, and wherein like numerals of reference indicate corresponding parts throughout the several views, in which—

Figure 1 is a plan view of a horseshoe-blank before my improvements are attached thereto. Fig. 2 is a similar view of the same having the toe-piece and heel-pieces attached to the shoe. Fig. 3 is a vertical sectional view taken on the line 3 3 of Fig. 1. Fig. 4 is a like view taken on the line 4 4 of Fig. 2 looking in the direction of the arrow. Fig. 5 is a vertical sectional view taken on the line 5 5 of Fig. 2. Fig. 6 is a perspective detail view of the toe-piece. Fig. 7 is a similar view of one of the heel-calks.

In the drawings the reference-numeral 1 indicates the horseshoe-blank having formed therein the usual openings 2 for the reception of nails and fastening means. This blank is preferably formed with a groove 3, which follows the contour of the shoe.

The reference-numeral 4 indicates the toe-piece, which is semicircular in form and is provided with an outwardly-extending rounded flange or ridge 5, and above this ridge the outer face of the toe-piece is tapered, terminating in a sharpened edge 6. This toe-piece is manufactured of hard steel.

The reference-numeral 7 indicates the heel-calk, which likewise carries an outwardly-extending flange or ridge 8, and above this ridge the outer face of the heel-calk is tapered, terminating in the edge 9. The edges 6 and 9 are preferably drawn almost to a knife-edge, so as to drive easily into the shoe-blank. It will be understood that there also may be a sharp outer edge formed upon both the calks and toe-pieces in winter and that such change would be within the scope of the present invention.

In order to apply the calks and toe-pieces to the horseshoe, the blank or horseshoe is heated to a cherry-red heat or a welding heat, but does not necessarily require a welding heat, and the calks and toe-pieces are then placed in proper position upon the shoe. In case there is a groove formed in the shoe the calks and toe-pieces are placed in the groove and any suitable brazing material is placed adjacent to the calks and toe-pieces, and by pressing the same into the horseshoe the calks and toe-pieces are brazed to the horseshoe in the proper position. In case the blank or horseshoe does not contain a ridge or groove these calks and toe-pieces, being formed in the manner shown, will lodge themselves into the shoe by pressing the same, and the brazing material is then applied to the same and the calks and toe-pieces substantially brazed to the shoe, thereby completing the article. The shoe proper may be formed of any suitable material, such as iron, soft steel, or the like; but both the calks and toe-pieces are formed of hard steel, as I have found in actual practice that the best results are obtained in this manner.

When it is desired to remove the calks and toe-pieces from the shoe, the latter is again subjected to heat and then the shoe turned so as to allow both the calks and toe-pieces to point downwardly. Then by a quick jar of the shoe against a hard substance the calks will disengage themselves from the shoe and may in this manner be easily removed. Then new calks and toe-pieces may again be applied to the old shoe.

The many advantages obtained by the use of my improvement will be readily apparent from the foregoing description, taken in connection with the accompanying drawings, and it will be noted that various changes may be made in the details of construction without departing from the general spirit of my invention.

Having thus fully described my invention, what I claim as new, and desire to secure by Letters Patent, is—

As an improved article of manufacture, a horseshoe comprising an iron shoe-blank having its lower face grooved, and hardened-steel toe and heel pieces adapted to engage in the groove in the under face of the shoe, a rounded ridge made integral with the outer face of said toe and heel pieces, the outer face of the toe and heel pieces above the ridge being tapered and terminating in an edge, the said edge adapted to be driven into the shoe, and the ridge adapted to lie partly within the groove when the toe and heel pieces are in position, substantially as described.

In testimony whereof I affix my signature in the presence of two witnesses.

HENRY JENKINS.

Witnesses:
JOHN NOLAND,
E. E. POTTER.